United States Patent [19]

Bridges

[11] 3,835,332
[45] Sept. 10, 1974

[54] INSPECTION APPARATUS FOR DETECTING DEFECTS IN A WEB

[75] Inventor: Robert E. Bridges, Pittsford, N.Y.

[73] Assignee: Eastman Kodak Company, Rochester, N.Y.

[22] Filed: June 4, 1973

[21] Appl. No.: 366,818

[52] U.S. Cl.............. 250/563, 250/214 R, 356/200
[51] Int. Cl. .......................................... G01n 21/32
[58] Field of Search.... 250/219 DF, 219 FR, 214 R, 250/219 D, 217 SS, 562, 563, 572; 356/199, 200, 237, 239

[56] References Cited
UNITED STATES PATENTS

| | | | |
|---|---|---|---|
| 3,560,751 | 2/1971 | Buettner | 250/214 R |
| 3,654,476 | 4/1972 | Hakki | 250/217 SS |
| 3,699,349 | 10/1972 | Paulus | 250/219 FR |
| 3,749,496 | 7/1973 | Hietanen et al. | 250/219 DF |

Primary Examiner—Walter Stolwein
Attorney, Agent, or Firm—Mr. N. D. McClaskey

[57] ABSTRACT

Apparatus is disclosed in which a moving web is scanned by repetitively pulsing a set of light emitting diodes in sequence and the resulting light passing through, or reflected from, the moving web is detected by a set of photosensors. The output signal of each photosensor is converted into a digital code, representing the intensity of the detected light. During a calibration mode of operation, the apparatus converts the codes generated by repeated scanning of a defect-free web into data representing the normal ranges of variation in the amplitude and in the scan-to-scan difference in amplitude of signals generated by each photosensor. After calibration of the apparatus is completed, scanning of the web to be inspected begins and the digital codes generated are applied to the calibrated apparatus, which compares them with the data representing the normal ranges of variation in the photosensor output signal characteristics to determine if defects are present in the web.

16 Claims, 8 Drawing Figures

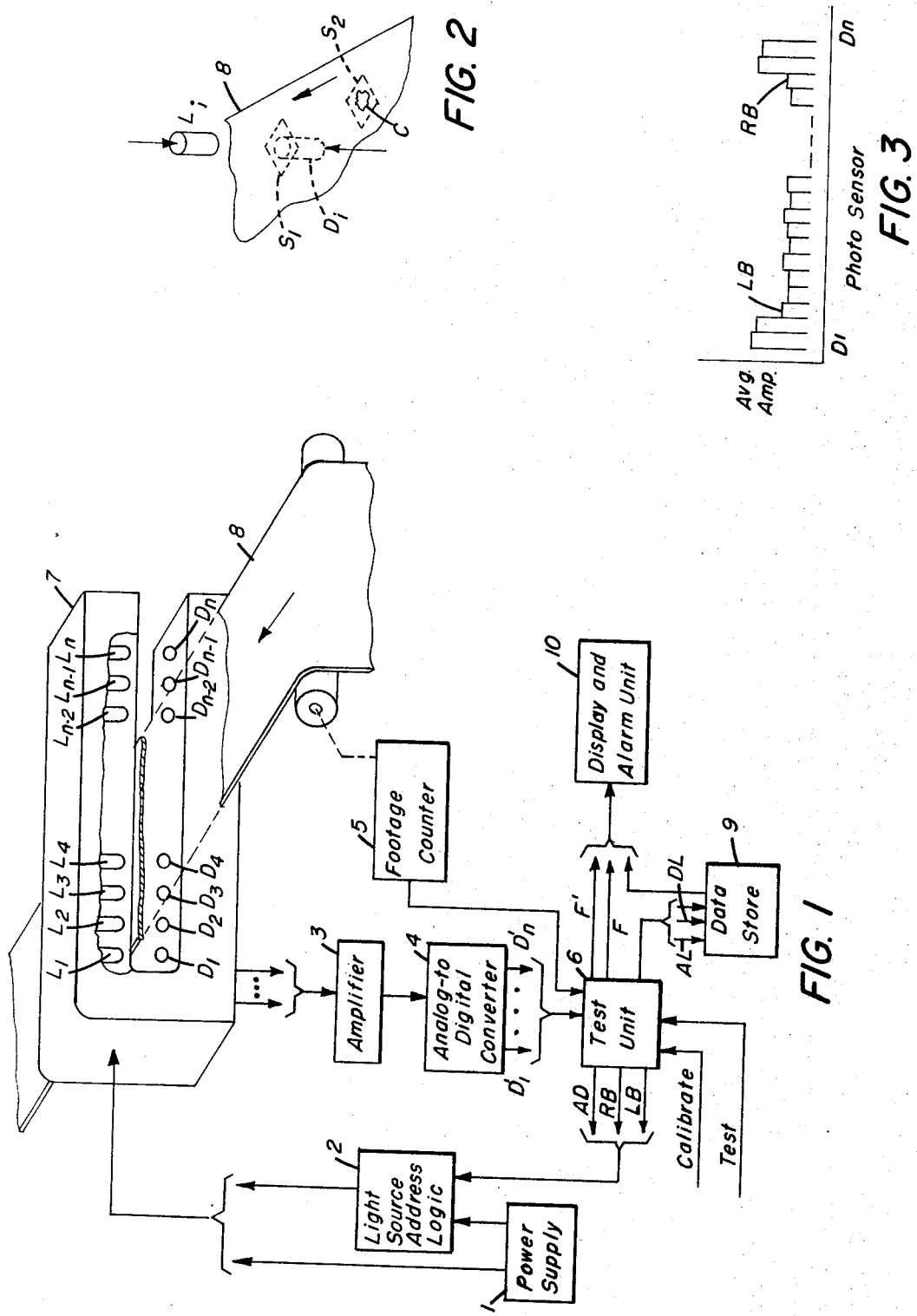

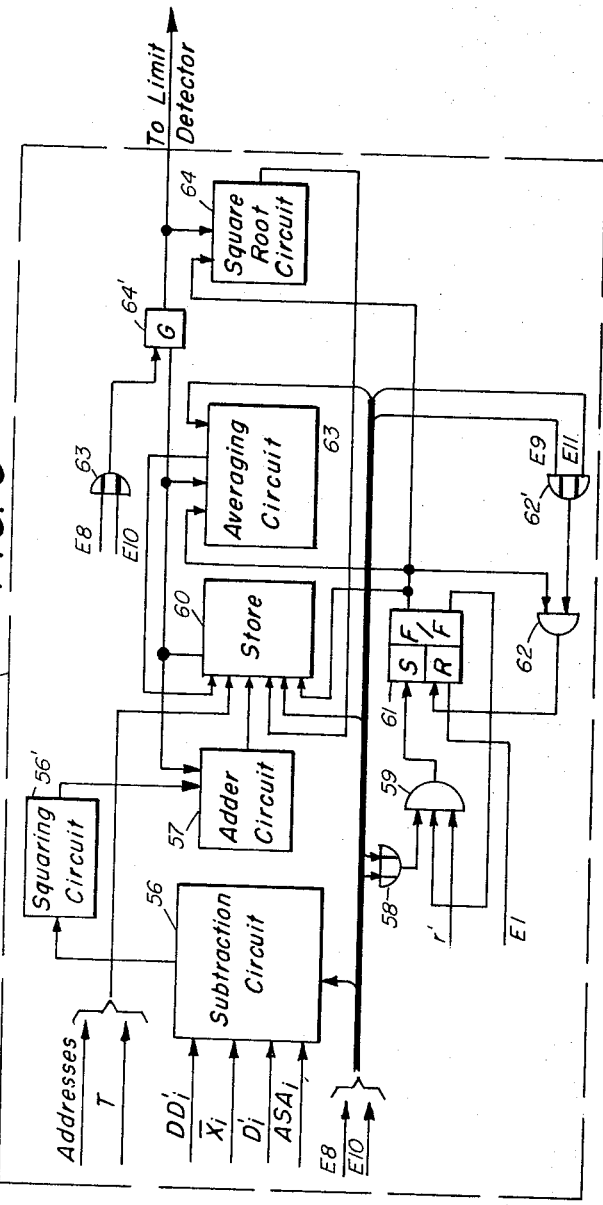
FIG. 6
FIG. 5
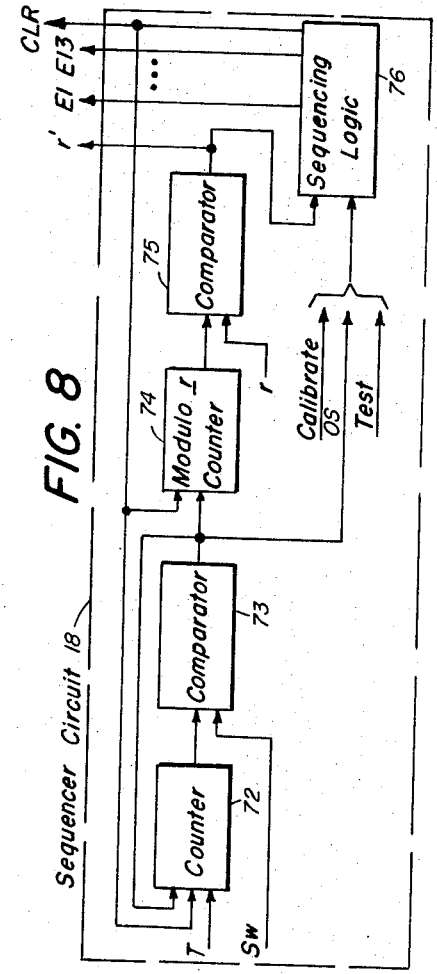
FIG. 8
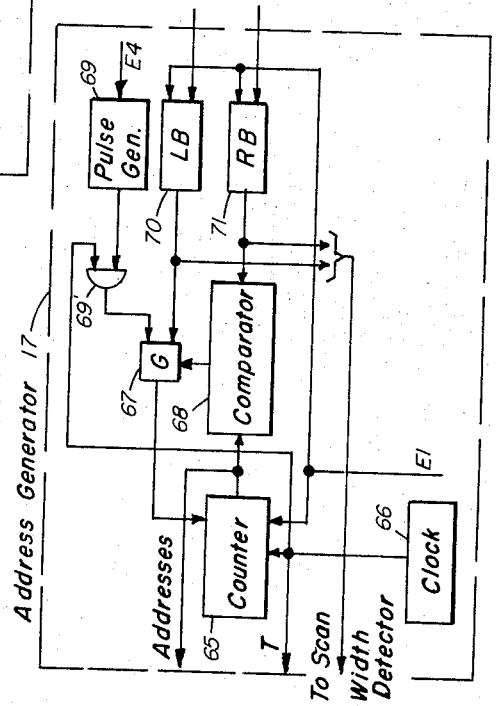
FIG. 7

INSPECTION APPARATUS FOR DETECTING DEFECTS IN A WEB

BACKGROUND OF THE INVENTION

1. Field of the Invention

This invention relates to apparatus for detecting defects in a moving web and, more particularly, to web inspection apparatus that scans a moving web by sequentially pulsing a set of light sources, and automatically calibrates itself by converting the resulting signals generated by a set of photosensors into data representing normal ranges of variation in selected characteristics of the photosensor output signals.

2. Description of the Prior Art

Numerous different types of apparatus for inspecting a moving web are well known. Generally, a constant source of light is used to illuminate one side of the moving web and photosensors detect the intensity of light passing through, or reflected from, the web. The detected light intensity, which is modulated by variations in the web, is converted into signals that are used in determining when defects, such as unwanted variations in web thickness or flaws in a coating deposited on the web, are present. Normally, such inspection apparatus is manually calibrated. That is, defect detection is accomplished by comparing the signals representing photosensor outputs with constants whose values are manually selected. An example of manually calibrated web inspection apparatus using a constant source of light to continuously illuminate a portion of a web being inspected is shown in Hiroo Akamatsu et al., U.S. Pat. No. 3,515,883, issued on June 2, 1970. Another type of such apparatus, shown in W. H. Crowell et al., U.S. Pat. No. 3,534,402, issued on Oct. 3, 1970, uses constant illumination of a web to obtain data, representing a measure of the uniformity of web density, that is applied to a manually calibrated defect detection circuit. Still another type of manually calibrated inspection apparatus uses a rotating multifaceted mirror to sweep a spot of light across the surface of a moving web being inspected. Where the web being inspected is coated with a photosensitive emulsion, the spot of light is obtained by illuminating the rotating mirror with a constant light source, such as a laser, that emits light with a spectrum in the near infrared region to which the emulsion is not sensitive.

When the web being inspected is photographic film, it is desirable to detect small defects in the photosensitive emulsion on the web without fogging the film as a result of illuminating it during inspection. To avoid the problem of fogging, portions of the film are illuminated with light including only wavelengths in the infrared region mentioned above and only for short intervals. Consequently, the prior art sweeping spot inspection apparatus is preferred over the other types of prior art mentioned above when photographic film is being inspected. Due to the use of a rotating mirror in the sweeping spot inspection apparatus, it is very difficult to accurately detect small defects, since the mechanical components of the apparatus result in a high noise level in the signals generated by the photosensors used to detect light intensity. In essence, the signals produced by small defects in the coating on the film being inspected are buried in noise signals, and it is very difficult to determine when such defect signals are present in the output of a photosensor. Additionally, it is difficult to properly align the rotating mirror and, due to the high operating speed of the mirror, alignment and repair of the apparatus is frequently required. Furthermore, the laser consumes substantial amounts of power and must be replaced relatively frequently. Finally, acceptable or normal variations in a web or coating thickness, and vibration or flutter present in a moving web produces variation in photosensor outputs even when a defect-free web is being inspected. In essence, the output of a photosensor used to monitor a section of a defect-free web will vary normally over a range of values due to these factors, and this normal variation in photosensor output can result in erroneous indications of web defects when the photosensor outputs are compared with a manually selected reference signal to detect web defects.

While the prior art inspection apparatus operates adequately in many applications, it is not capable of efficiently and reliably detecting small defects in a moving web. The use of a light source to continuously illuminate a large section of web is inefficient, since only a small portion of the light is used at any one time during the inspection process. Additionally, the continuous operation of light sources reduces their operating life and the intensity of the light produced is likely to vary, giving erroneous indications of defects. With regard to accuracy, manual selection of the constant values compared with the photosensor output signals to detect defects limits the accuracy of the apparatus. Furthermore, the accuracy of defect detection is affected where mechanical apparatus is used to scan the web with a spot of light, since a high noise level is present in the photosensor output signals, making detection of signals generated by small defects difficult. Finally, when mechanical apparatus is used to produce scanning of a web, frequent maintenance and alignment are required to insure that the apparatus is operating properly.

SUMMARY OF THE INVENTION

In accordance with the invention, a set of individual light sources are repetitively illuminated for short intervals, in sequence, to produce continuous scanning of a web moving adjacent to the light sources. During a calibration mode of operation, apparatus implementing the invention converts photosensor output signals generated by pulses of light transmitted through, or reflected from, a moving defect-free web into stored data representing the acceptable or normal ranges of variation in selected characteristics of photosensor output signals. After calibration of the apparatus is completed, a web to be inspected is scanned, and the variations in the selected characteristics of the resulting photosensor output signals are compared with the stored data to determine if defects are present in the web or web coating. When, for instance, the scan-to-scan difference in amplitude of signals generated by a photosensor exceeds the normal range of variation in such differences for the photosensor, represented by stored data, the comparison results in the generation of an alarm signal indicating the presence of a defect in the web. Similarly, a defect signal may be generated when the amplitude of signals generated by a photosensor falls outside of the normal range of signal amplitudes, represented by stored data, generated by the photosensor.

Generally, the advantages provided by the invention are increased efficiency, reliability, and accuracy of web inspection apparatus. The use of pulsed light sources can result in longer trouble-free operation of web inspection apparatus and reduce problems arising from drift in the intensity of the light emitted by the sources. The invention also provides photosensor output signals which contain a low noise level, and this facilitates accurate detection of small defects in the web or coating being inspected. Furthermore, since the invention eliminates the need for mechanical apparatus to scan a web with a beam of light, alignment and maintenance problems are minimized. Finally, the accuracy of defect detection is further increased as a result of comparing automatically determined data, representing normal range of variation in characteristics of photosensor output signals, with signals generated during the inspection of a web to detect the presence of defects in the web.

OBJECTS OF THE INVENTION

It is an object of this invention to increase the efficiency, accuracy, and reliability of apparatus used in inspecting a web.

It is a more specific object of this invention to eliminate the need for mechanical apparatus in producing a scanning beam of light useful in inspecting a moving web.

It is another specific object of this invention to reduce the noise level present in photosensor output signals generated by apparatus used in inspecting a moving web.

It is another specific object of the invention to increase the accuracy of apparatus used in detecting defects in a moving web by comparing data representing variation in selected characteristics of photosensor output signals with data representing the normal ranges of variation in these characteristics for signals generated by the photosensors when a defect-free web is scanned.

It is a still more specific object of the invention to accurately detect small defects in a coating on a moving web by intermittently illuminating sections of the coated web and converting the intensity of light transmitted through, or reflected from, the coated web into signals whose amplitudes are compared with stored data representing the normal ranges of variation in amplitude of such signals generated by the scanning of a defect-free web.

It is another specific object of the invention to accurately detect small defects in a coating on a moving web by determining the scan-to-scan difference in amplitude of signals generated by photosensors, during the repetitive scanning of the web with pulsed light sources, and comparing these detected differences with data representing the normal range of variation in such differences when a defect-free web is being scanned.

DESCRIPTION OF THE FIGURES

Other objects and advantages of the invention will become apparent from the following description with reference to the accompanying drawings, in which:

FIG. 1 is a general block diagram of web inspection apparatus incorporating the invention;

FIG. 2 is useful in describing the operation of the inspection apparatus shown in FIG. 1;

FIG. 3 shows waveforms useful in describing the operation of the inspection apparatus;

FIG. 5 is a symbolic representation of a memory that is useful in describing the operation of the test unit shown in FIG. 4;

FIG. 6 is a detailed block diagram of a difference variation detector shown in FIG. 4;

FIG. 7 is a detailed block diagram of an address generator shown in FIG. 4; and

FIG. 8 is a detailed block diagram of a sequencer circuit shown in FIG. 4.

DESCRIPTION OF THE ILLUSTRATIVE EMBODIMENT

Figure 4:
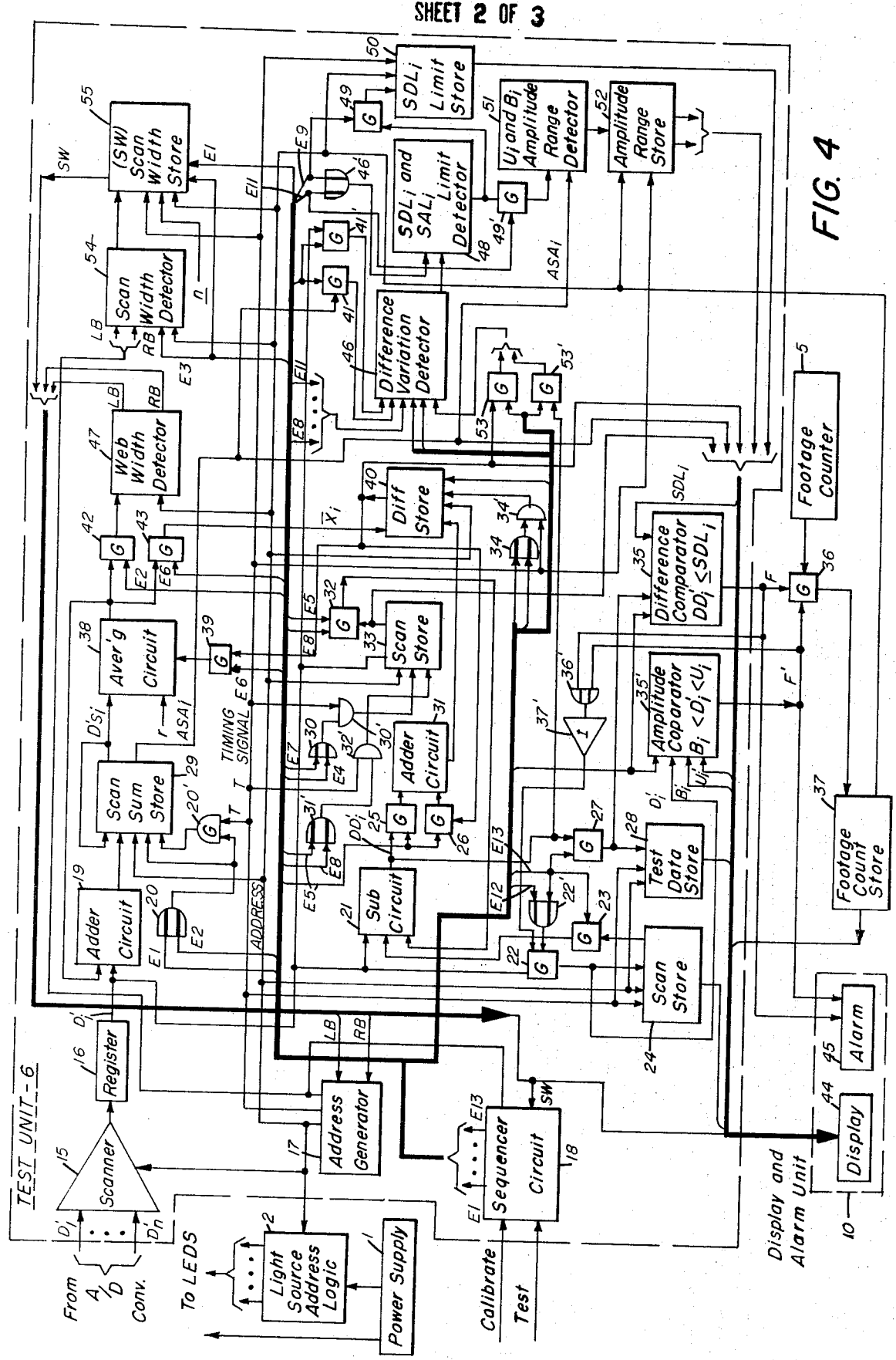
FIG. 4 is a detailed block diagram of a test unit shown in FIG. 1.

A general block diagram of web inspection apparatus incorporating the invention is shown in FIG. 1. For purposes of discussion, it will be assumed that a web 8 coated with photosensitive emulsion is being inspected. In practice, the web 8 would be moving through an emulsion coating machine and the inspection could take place just after the emulsion has been coated on the web at a coating station. Inspecting the emulsion coating on the web at such a point provides early detection of defects in the coating and minimizes the waste resulting from a faulty coating operation.

As the coated web 8 (FIG. 1) moves past an inspection station 7, it passes between a set of light sources $L_1$ through $L_n$ and a set of photosensors $D_1$ through $D_n$ aligned with the light sources. While this arrangement detects defects in the web coating by monitoring light transmitted through the web, it is obvious that the light sources and photosensors in the inspection station 7 could also be arranged in one of a number of well-known ways to detect defects by monitoring the light reflected from the illuminated web surface. In either arrangement, a test unit 6 repetitively generates a set of address signals {AD}, each identifying a unique light source, that are applied sequentially to address logic 2. In the illustrative embodiment, it is assumed that the light sources are light emitting diodes (LED's) which may be illuminated or pulsed for very short intervals, and which respond to pulsing by emitting light with wavelengths in the infrared spectrum. As each LED address is applied to the address logic 2, the logic responds by applying a voltage from the power supply 1 to and LED in the inspection station 7, resulting in the addressed LED being illuminated for a short interval. An example of the type of LED suitable for use in the inspection station is the General Electric SSL55C LED, which provides illumination that is very stable in intensity and wavelength spectrum when pulsed for intervals in the range of thirty microseconds. Where the address applied to the address logic 2 identifies the LED $L_1$, this LED will be pulsed and, as each succeeding address is sequentially applied to the address logic 2, the LED's $L_2$ through $L_n$ will be pulsed sequentially. These operations result in one scan along the length of the inspection station 7. The LED's and photosensors may be so arranged that either a continuous section, or a set of discrete portions, of the web 8 is covered during a scan across the web. After the scan is completed, the test unit 6 will again generate the set of LED addresses, resulting in another scan along the length of the inspection station 7.

As each LED $L_i$ (FIG. 1) is pulsed, the photosensor $D_i$ aligned with the LED converts the light energy it receives into a signal with an amplitude that is related to the intensity of the received light. For instance, when the LED's $L_1$, $L_2$, and $L_3$ are pulsed, the photosensors $D_1$, $D_2$, and $D_3$, respectively, respond to the light energy that they receive from these LED's. The resulting sequential outputs of the photosensors $D_1$ through $D_3$ are amplified by the amplifier 3 and converted from analog signal levels to digital codes, representing these signal levels, by an analog-to-digital converter 4. This sequence of operations is repeated as each of the remaining LED's $L_4$ through $L_n$ are sequentially pulsed. Consequently, a sequence of digital codes $D'_1$ through $D'_n$ appear at the output of the analog-to-digital converter 4 during each scan along the length of the inspection station 7.

Each of the digital codes $D'_1$ through $D'_n$ (FIG. 1) is applied to the test unit 6 as it is generated. The test unit 6, described in detail later, may operate in one of two modes: a calibration mode or a test mode. During the calibration mode, a section of defect-free web, of the type to be tested later, is transported past the inspection station 7, and the test unit 6 converts the sets of digital codes $\{D'_i\}$ generated during repeated scanning of the defect-free web into data that represents the normal ranges of variation in certain characteristics of the photosensor output signals generated during the scanning. As previously mentioned, the variations in a photosensor's output signal amplitude and the variations in the scan-to-scan difference in the amplitude of signals generated by the photosensor on successive scans are examples of the types of signal characteristic variations represented by the data.

Initially, all of the LED's $L_1$ through $L_n$ (FIG. 1) are pulsed sequentially $r$ times and the test unit 6 averages the digital codes generated by the outputs of each photosensor $D_1$ through $D_n$ to obtain a set of data representing the average amplitude of the signals generated by each photosensor. An example of such data is represented graphically in FIG. 3. These data are stored in a data store 9, which may be either a single store or a combination of individual stores, for use in determining the width of the web 8 to be tested and in adjusting the scan to cover only this web width. Since the web does not cover the photosensors $D_1$, $D_2$, $D_{n-1}$, and $D_n$, the average outputs of these photosensors are higher than the average outputs of the photosensors covered by the web. The test unit 6 determines the left and right boundaries of the web and limits the addresses it generates in the future to the addresses of the LED's $L_3$ through $L_{n-2}$. This limits future scanning to the width of the web 8, since only the LED's $L_3$ through $L_{n-2}$ will be pulsed.

After the proper scan width has been determined, the test unit 6 (FIG. 1) converts the data generated by $r$ more scans of the web 8 into a set $\{DL\}$ of previously mentioned data representing the normal ranges of variation in the scan-to-scan difference in amplitude of output signals generated by each photosensor $D_3$ through $D_{n-2}$ included in the scanning of the defect-free web. The set of data $\{DL\}$ represents measures of the effects of web flutter and acceptable variations in the web and emulsion coating on the output signals of each of the photosensors $D_3$ through $D_{n-2}$. The last step in the calibration process involves converting data obtained from another $r$ scans of the web into a second set $\{AL\}$ of previously mentioned data that represents the normal range of variation in the output signal amplitudes of each of the photosensors $D_3$ through $D_{n-2}$ included in the scanning of the defect-free web. The set of data $\{AL\}$ is used to determine when a gradual change in a characteristic of the web or its coating, such as thickness, has occurred and exceeds acceptable levels. These sets of data $\{DL\}$ and $\{AL\}$ are stored in the data store 9 for later use in the actual inspection of a web.

After the calibration of test unit 6 (FIG. 1) is completed, the test mode of operation is entered. At this point, the web to be inspected is transported past the inspection station 7 and it is repetitively scanned by the sequential pulsing of the LED's $L_3$ through $L_{n-2}$ in the manner previously described. As each LED $L_i$ is pulsed, its associated photosensor $D_i$ generates a signal proportional to the light transmitted through the web 8, and this signal is converted into a digital code $D'_i$ that is applied to the test unit 6. During the test mode of operation, the test unit 6 compares each of the outputs $D'_i$ generated by the analog-to-digital converter 4 with the stored data $AL_i$ representing the normal range of variation in the amplitude of signals generated by the photosensor $D_i$. If the signal amplitude represented by $D'_i$ falls outside of the amplitude range represented by the data $AL_i$, the test unit 6 stores the contents of a footage counter 5 in a location of the store 9 associated with the photosensor $D_i$, and generates a signal F indicating the detection of a defect. Storing the footage counter contents in the location of the store 9 associated with the photosensor $D_i$ provides coordinate information identifying the location of the detected defect on the web. This coordinate information and the signal F are applied to a display and alarm unit 10. The defect condition resulting in the performance of these operations can be produced by a gradual change in web opacity due to, for example, a variation in web or emulsion coating thickness or the presence of foreign matter in the web or coating. On the other hand, if there is no such defect in the portion of the web illuminated by pulsing the LED $L_i$, the signal amplitude represented by the resulting code $D'_i$ falls within the amplitude range represented by the data $AL_i$, the signal F is not generated as a result of the comparison.

Simultaneous with the performance of the first test, a second test is performed to detect the presence of discrete defects, such as uncoated areas or foreign matter, in the web coating. The digital code $D'_i$ (FIG. 1) generated in response to the occurrence of the photosensor $D_i$ output during the current scan of the web is subtracted from a digital code $D'_{i,p}$ contained in the store 9, that was generated in response to the occurrence of that photosensor's output on the preceeding scan of the web. After this subtraction, the code $D'_i$ generated during the current scan replaces the code $D'_{i,p}$ stored during the preceeding scan if no defect is detected. The difference obtained from the subtraction is compared with the previously determined data $DL_i$ representing the normal range of variation in the scan-to-scan difference in amplitude of signals generated by the photosensor $D_i$ to determine if a discrete defect is present in the illuminated section of the web. More specifically, the defect-free section $S_1$ (FIG. 2) of the web 8 is illuminated by the LED $L_i$ during one scan of the web and the resulting code $D'_{i,p}$, generated in response to the output of the photosensor $D_i$, is stored in the store 9 (FIG. 1) as well as being used in determining if there are defects in this section $S_1$ of the web. Since the web is moving, the LED $L_i$ will illuminate the section $S_2$ of the web during the next scan. The section $S_2$ contains a defect C, and the light transmitted through this section $S_2$ will differ substantially from the light transmitted through the defect-free section $S_1$ on the preceeding scan. Consequently, when the digital code $D'_i$, representing the intensity of the light passing through the section $S_2$ during the current scan, is subtracted from the stored code $D'_{i,p}$, representing the intensity of the light passing through the section $S_1$ of the web on the preceeding scan, a difference will be obtained with a magnitude that exceeds the value of the data $DL_i$ representing the normal range of variation in such differences for the photosensor $D_i$. When this occurs, the test unit 6 identifies the position of the defect on the web, as previously described, by storing the contents of the footage counter 5 in a location of the store 9 associated with the photosensor $D_i$, and generates a signal $F'$, indicating the presence of the defect C, that is applied to the display and alarm unit 10. In this case, the code $D'_i$ will not replace $D'_{i,p}$ in the store 9, since $D'_i$ represents a defect condition and cannot be used to accurately determine the difference between the code generated by the next pulsing of the LED $L_i$ and a code generated as a result of illuminating a defect-free section of the web with the LED $L_i$. Hence, the code $D'_{i,p}$, generated by the illumination of the defect-free section $S_1$ of the web with the LED $L_i$, is not replaced, and it will be used again when the code $D'_i$ is generated on the next scan of the web.

Where the section $S_2$ contains no defect, the light transmitted by it and the section $S_1$ is of similar intensity, and the magnitude of the difference obtained in subtracting the two codes generated in response to the outputs of the photosensor $D_i$ on successive scans is within the range represented by the data $DL_i$ for that photosensor. In this latter case, where no defect is present in the illuminated section $S_2$ of the web, the signal $F'$ is not generated and the contents of the footage counter is not stored.

The operations described above are performed for the outputs of each photosensor $D_3$ through $D_{n-2}$ as each LED $L_3$ through $L_{n-2}$ is pulsed during the scan of a web. It is apparent that as the speed of scanning increases, the percentage of web surface inspected increases. Since efficient illumination can be obtained with commercially available LED's pulsed for very short intervals, extremely high scan rates can be achieved. Hence, by providing a high-speed test unit capable of processing the signals generated by the photosensors at high-speed scanning rates, it is possible to inspect the entire web surface, even when the web is travelling at high speeds.

A detailed block diagram of a circuit suitable for use as the test unit 6 (FIG. 1) is shown in FIG. 4. The digital codes $D'_1$ through $D'_n$ generated by the analog-to-digital converter 4 (FIG. 1) during scans of a defect-free web are applied to a scanner 15. This scanner can be any one of numerous types of well-known electronic scanners. An address generator 17 (FIG. 4) generates the digital codes, identifying the LED to be pulsed, that are applied as addresses to the LED address logic 2. These addresses are also applied to the scanner 15 to synchronize the operation of the test unit with the generation of the digital codes $D'_1$ through $D'_n$. It will be recalled that these codes are derived from the outputs of the photosensors $D_1$ through $D_n$ that are generated in response to the sequential pulsing of the LED's $L_1$ through $L_n$ associated with the photosensors.

The sequence of operations performed by the test unit 6 (FIG. 4) is controlled by a set of enable signals $\{E_i\}$ generated by a sequencer circuit 18, described in detail later, that is similar in design to numerous well-known sequencer circuits. When a calibrate signal is applied to the sequencer circuit 18, the circuit generates a signal $E_1$ that clears the address generator 17 and initiates the operations performed in averaging the output signal amplitudes of the photosensors $D_1$ through $D_n$ (FIG. 1) over $r$ scans with all of the LED's $L_1$ through $L_n$ being pulsed. During these $r$ scans, the digital codes generated by the analog-to-digital converter 4 are applied to the adder 19 (FIG. 4) via the scanner 15 and the storage register 16. Simultaneously, the sequencer signal $E_1$ enables the OR gate 20, whose output, along with the addresses generated sequentially by the address generator 17, results in the contents of locations in the scan sum store 29 being sequentially applied to the second input of the adder 19. The store 29 (FIG. 5) has the same number of storage locations as there are photosensors, and access to the store is synchronized with scanning, since the store is addressed with the same addresses that are used to produce a scan of a web. This results in the sum of past codes $D'S_i$ generated by previous outputs from each photosensor $D_i$, and contained in a location $MA_i$ of the store 29, being added to the code $D'_i$ generated by the output of that photosensor $D_i$ when its associated LED $L_i$ is pulsed during the current scan of the web. The new sum present at the output of the adder 19 (FIG. 4) replaces the contents of the memory location $MA_i$ when timing signal T generated by the address generator 17, in conjunction with the "1" output of the enabled OR gate 20, enables the AND gate 20'. The signal T (FIG. 7) is a clock pulse used to control the changing of addresses generated by the address generator 17, and its use to store the new sum insures that the storing operation occurs prior to a change in the current address $MA_i$ present in the output of the address generator 17. During the repetitive pulsing of the LED's $L_1$ through $L_n$, the sums $D'S_1$ through $D'S_n$ representing the sums of the output signal amplitudes generated by each of the photosensors $D_1$ through $D_n$, are stored in the locations $MA_1$ through $MA_n$ of the store 29, respectively.

As each address change occurs at the output of the address generator 17 (FIG. 4), the timing signal T producing the change is also applied to the sequencer 18. A counter 72 (FIG. 8) in the sequencer circuit is incremented as a result of the application of each signal T. The output of this counter is applied to a comparator 73 that compares it with the contents of a store 55 (FIG. 4), indicating the number SW of LED's to be pulsed during a scan. The store 55 is set equal to $n$ when the signal $E_1$ is generated by the sequencer circuit 18, at the beginning of the calibration mode, since all of the LED's are intially pulsed in a scan. Consequently, the sequencer circuit counter 72 output is initially compared with $n$, and when it reaches $n$, indicating that one scan has been completed, the comparator 73 generates a signal that clears the counter 72 and increments a modulo $r$ counter 74 by one. Clearing the counter 72 prepares it for counting the LED's pulsed during the next scan of the web, and incrementing the modulo $r$ counter indicates the completion of one scan. After $r$ scans have been completed and the sums $D'S_1$ through $D'S_n$ of the amplitude codes generated in response to outputs from each of the photosensors $D_1$ through $D_n$ over $r$ scans have been stored in the store 29 (FIG. 4), the contents of the modulo $r$ counter 74 equals $r$. When this output $r$ of the counter 74 is applied to a comparator 75, the comparator generates a signal $r'$, indicating the existence of this condition. The signal $r'$ generated by the comparator 75 is applied to the sequencing logic 76 and results in its output signal being changed from $E_1$ to $E_2$. The generation of the signal $E_2$ by the sequencer circuit 18 (FIG. 4) indicates that the sums $D'S_1$ through $D'S_n$ of the codes generated in response to the outputs of each of the photosensors $D_1$ through $D_n$, over $r$ scans, are available in the store 29 for use in obtaining a set of codes representing the average output signal amplitude for each photosensor. It will be recalled that this set of signal amplitude averages are used in automatically determining the width of the web being inspected.

When the signal $E_2$ is generated by the sequencer circuit 18 (FIG. 4), the OR gate 20 is again enabled, and the output of this gate, combined with the addresses generated by the address generator 17, results in the amplitude sum code $D'S_i$ for each photosensor $D_i$ being accessed from the store 29 and sequentially applied to an averaging circuit 38. This circuit divides each of the sums $D'S_i$ by $r$ to obtain a code $ASA_i$ representing the average amplitude of signals generated by each photosensor over $r$ scans. Each of these codes $ASA_i$ is simultaneously stored in the store 29 and applied to a web width detector 47, through a gate 42 enabled by the signal $E_2$, which detects the width of the web to be scanned from the relative magnitudes of these codes. In essence, the web width detector 47 compares the magnitude of each currently applied average code $ASA_i$ with the magnitude of the average code $ASA_{i-1}$ last applied, and stores the address of the LED whose pulsing resulted in the code with the smallest magnitude in a register in the address generator 17 when the difference in magnitudes exceeds a predetermined amount. As shown in FIG. 3, the average output signal amplitudes for photosensors with no web covering them are substantially higher than the average output signal amplitudes for photosensors covered by the web. Consequently, it is a simple matter to distinguish between the two types of average outputs. In the illustrative embodiment, the web width detector 47 stores the addresses LB and RB associated with the LED's (FIG. 1) $L_3$ and $L_{n-2}$ in registers 70 and 71 (FIG. 7) in the address generator 17. The contents of these registers are also inputs to the scan width detector 54 (FIG. 4). At this point, the sequencer circuit 18 output changes from the signal $E_2$ to the signal $E_3$, resulting in the scan width detector 54 determining the number $SW = n - 4$ of LED's included in the scan width identified by the two addresses, and replacing the number $n$, originally stored in the scan width store 55 when the scan width detector was initialized, with the value $SW$. It will be recalled that the contents $SW$ of this store 55 are used by the sequencer circuit 18 for counting scans to determine when selected mode signals $E_i$ are to be generated.

As mentioned above, the scans are now limited to the width of the web 8 (FIG. 1) as a result of storing the LED addresses LB and RB generated by the web width detector 47 (FIG. 4) in the address generator registers 70 (FIG. 7) and 71, respectively. After the addresses LB and RB of the LED's $L_3$ and $L_{n-2}$ are stored in the registers 70 and 71, and the value $SW$ is determined by the scan width detector 54 (FIG. 4), the output of the sequencer circuit 18 changes to $E_4$. When this occurs, a pulse generator 69 (FIG. 7) generates a pulse that, in conjunction with the occurrence of the timing signal T, enables an AND gate 69'. The output of this gate 69' enables a gate 67, resulting in the LED $L_3$ address LB being gated from the register 70 into the counter 65. This sets the lower limit in the counter 65 equal to LB instead of zero. Hence, when the first scan begins during the interval that the sequencer 18 output is $E_4$, the counter will begin by addressing the LED $L_3$, and sequentially address the LED's up to $L_{n-2}$. At this point, the counter 65 contents will equal the address RB of the LED $L_{n-2}$ stored in the register 71. When this occurs, the comparator 68 generates a signal that enables the gate 67, and the contents of the counter 65 are again replaced with the contents LB of the register 70 which represent the address of LED $L_3$. In this manner, the scan of the inspection station 7 (FIG. 1) is limited to the width of the web 8 being scanned.

Following the determination of scan width, scanning of the web continues and the average scan-to-scan difference in signal amplitude for each photosensor over $r$ scans is determined. As mentioned above, after the scan width is determined by the scan width detector 54 (FIG. 4), the sequencer circuit 18 output changes from $E_3$ to $E_4$. The generation of the signal $E_4$ results in the codes $D'_3$ through $D'_{n-2}$, representing the output of each photosensor over a scan, being stored in a store 33 that is similar to the previously discussed store 29. The generated codes are applied to the store 33 in synchronism with the addresses generated by the address generator 17 which determine the location at which each code is to be stored. Each storing operation is controlled by the previously mentioned timing signal T, generated by the address generator 17, and the signal $E_4$. The signal $E_4$ enables the OR gate 30 and the output of this gate, in conjunction with the signal T, enables the AND gate 30'. The output of the gate 30' results in the codes being stored during the existence of the signal T.

After the codes representing the photosensor outputs on this scan have been stored in the store 33 (FIG. 4), the comparator 73 (FIG. 8) generates a signal OS indicating the end of a scan that results in the sequencer circuit 18 output changing to $E_5$ and the first of $r$ more scans of the web begins. The signal $E_5$ enables the gate 32, resulting in the codes stored in the store 33 during the last scan being accessed and applied to the subtraction circuit 21 in synchronism with the sequential generation of the codes $D'_3$ through $D'_{n-2}$ during the current second scan. The subtraction circuit 21 subtracts the two codes $D'_{i,p}$ and $D'_i$, representing the amplitude of a photosensor's output signal amplitude on the last scan and the current scan, respectively, and generates a difference code $DD'_i$. The signal $E_5$ also enables the gates 25 and 26, resulting in the difference $DD'_i$ at the output of the subtraction circuit 21 being added to a sum of scan-to-scan differences for the photosensor $D_i$ that is stored in a location in the difference store 40 associated with the photosensor. The store 40 is similar to the previously described store 29. It will be recalled that the store has $n$ locations, one for each photosensor, and the location associated with a given photosensor is addressed by the same address used to address the LED associated with the photosensor. Consequently, the application of the address for the LED $L_i$, present at the output of the address generator 17, to the difference store 40 results in the contents in the location associated with the photosensor $D_i$ being accessed and applied as the second input to the adder 31 through the enabled gate 26. In this case, the accessed location is zero, since the store 40 was cleared by the generation of the sequencer signal $E_1$ at the beginning of the calibration operation, and this is the first scan during the calibration that results in differences being stored in the store 40. The resulting sum replaces the zero in the location of the store 40, associated with the photosensor $D_i$ when the timing signal T is generated by the address circuit 17. More specifically, the signal $E_5$ enables the OR gate 34, and the simultaneous application of the "1" output of this gate and the signal T to the AND gate 34' result in the output of the adder 31 being stored in the location identified by the existing address present at the output of the address generator 17. On the next scan, during the processing of the output of the photosensor $D_i$, the difference stored in this location will be accessed, added to the difference at the output of the subtraction circuit 21, and the resulting sum will again be stored in this location.

The foregoing operations are repeated for each code $D'_i$ (FIG. 4) generated during each of the remaining $r - 1$ successive scans of the web performed while the output of the sequencer circuit 18 is $E_5$. After these scans have been completed, the difference store 40 contains a sum of $r$ scan-to-scan signal amplitude differences for each of the photosensors $D_3$ through $D_{n-2}$ that generated output signals during scanning of the web. The next step in the calibration is to determine the limits $SDL_i$ representing the normal difference in scan-to-scan signal amplitude for each of these photosensors when the defect-free web is being inspected. Upon completion of these $r$ scans, the output of the sequencer circuit 18 changes from $E_5$ to $E_6$. The signal $E_6$ enables the gates 39 and 43, resulting in the averaging circuit 38 averaging each of the sums of scan-to-scan differences stored in the difference store 40 over $r$ scans. The contents of the store 40 are sequentially accessed, applied to the averaging circuit 38, and the resulting averages $\overline{X}_i$ are stored again in the store 40. The operations performed in determining these averages $\overline{X}_i$ are similar to those previously described in discussing the averaging of the contents of the store 29.

Following the determination of the average scan-to-scan to-scan difference in signal amplitude $\overline{X}_i$ for each of the photosensors $D_3$ through $D_{n-2}$, a value $S_i$ is calculated that is related to the normal range of scan-to-scan signal amplitude difference variations for each photosensor $D_i$ generating outputs over the $r$ scans. The value of $S_i$ may be determined by any one of numerous different methods. One approach is to determine S in accordance with the following well-known statistical equation:

$$S_i = (X_{i,1} - \overline{X}_i)^2 + (X_{i,2} - \overline{X}_i)^2 + \ldots = (X_{i,n} - \overline{X}_i)^2/n \quad (1)$$

where $X_{i,j}$ = the difference between the photosensor $D_i$ output signal amplitudes generated on the $j - 1$ and $j$ scans;

$\overline{X}_i$ = the average scan-to-scan difference in signal amplitude for the photosensor $D_i$; and $n$ = the number of scans $r$ over which the summation is taken.

The scan-to-scan amplitude difference for each photosensor is obtained in a manner similar to that described above in discussing the operation of the subtraction circuit 21 (FIG. 4) and the scan store 33. At this point, the output of the sequencer circuit 18 changes to the signal $E_7$ which enables the OR gate 30. The AND gate 30' responds to the output of this gate 30 and the application of the timing signal T by generating signals that result in the codes $D'_i$ generated during this scan being stored in the store 33. After this scan is completed, the comparator 73 generates the signal OS and the output of the sequencer circuit 18 changes to the signal $E_8$. This signal enables the gate 32. Enabling the gate 32 results in the subtraction circuit 21 subtracting each code $D'_i$, generated by the output of each photosensor $D_i$ during the next scan, from the stored code generated by the photosensor during the preceeding scan. After each subtraction, the code generated during this scan replaces the code it is subtracted from in the scan store 33. This storing operation occurs as a result of the signal $E_8$ enabling the OR gate 31', and the AND gate 32', responding to the output of this gate and the timing signal T, generated by the address generator 17, by applying a store signal to the scan store 33 prior to a change in the address present at the output of the address generator. The differences $DD'_i$ obtained at the output of the subtraction circuit 21 are applied to the difference variation detector 46 via the gate 53', which also is enabled by the signal $E_8$.

As each output $DD'_i$ of the subtraction circuit 21 (FIG. 4), representing the scan-to-scan difference in signal amplitude for a particular photosensor $D_i$, is applied to the difference variation detector 46, a subtraction circuit 56 (FIG. 6) subtracts it from the previously determined average scan-to-scan difference $\overline{X}_i$ for the photosensor applied to the difference variation detector via the gate 53 (FIG. 4) that is enabled by the signal $E_8$. The resulting difference is then squared by a squaring circuit 56 (FIG. 6). An adder circuit 57 adds the squared difference to the contents of the location in a store 60 associated with that photosensor. These opeations generate data represented by the numerator of equation (1). After $r$ scans, the flip-flop 61, which was originally reset by the sequencer signal $E_1$, is set to enable the averaging circuit 63. The setting of the flip-flop results from the AND gate 59 being enabled by the "1" output of the OR gate 58, which is enabled by the signal $E_8$, the "1" output from the reset side of the flip-flop 61, and the signal $r'$ generated by the sequencer comparator 75 (FIG. 8), indicating the completion of $r$ scans. When the averaging circuit 63 is enabled, it averages the squared differences in the store 60 over $r$ scans in a manner similar to that described in discussing the averaging circuit 38 (FIG. 4), and the resulting average is stored in the store 60. When the averaging operations are completed, the output of the sequencer circuit 18 (FIG. 4) changes to $E_8'$, resulting in an OR gate 63' and a gate 64' being enabled. Enabling the gate 64' results in the contents of the store 60 being sequentially applied to a square root circuit 64 which determines the square root of each of the squared difference averages contained in the store 60 and replaces each of these averages in the store 60 with its square root. In this manner, a value $S_i$ is calculated in accordance with the equation (1), for each of the photosensors, that represents the normal variation of the scanto-scan difference in signal amplitudes generated by each photosensor from the average $\bar{X}_i$ scan-to-scan amplitude difference of the photosensor's output signals. The values $S_i$ are used to determine limits on the allowable variation of scan-to-scan difference in the amplitude of each photosensor's output signals. These limits are used during the actual inspection of a web. If, as previously mentioned, during the inspection of a web, the scan-to-scan difference in a photosensor's output signal amplitudes fall outside of the limits for that photosensor, this indicates the presence of a discrete defect in the web.

After the values $S_i$ have been determined and stored in the store 60 (FIG. 6), the output signal of the sequencer circuit 18 (FIG. 4) changes from $E_8'$ to $E_9$. The signal $E_9$ enables the OR gate 62' (FIG. 6) in the variation detector, and the output of this gate and the "1" output from the set side of the flip-flop 61 enables the AND gate 62, whose out-put resets the flip-flop. The resetting of the flip-flop 61 initializes the variation detector in preparation for use in the future.

The limit detector 48 (FIG. 4) responds to the output of an OR gate 46' enabled by the signal $E_9$. The limit detector 48 multiplies the $S_i$ value for each photosensor by some constant $g$ to obtain the set of scan-to-scan signal amplitude difference limits $\{SDL_i\}$ that is used during the inspection of a web. The value of $g$ will vary, depending on the nature of the web being inspected, the amount of web flutter induced as a result of moving the web, and the type of inspection being performed. The contant $g$ is determined empirically and the value selected is such that the resulting limits $\{SDL_i\}$ are of sufficient magnitude that substantially all normal scan-to-scan differences in a photosensor's output signal amplitude are less than the magnitude of its associated difference limit $SDL_i$. As each difference limit $SDL_i$ is determined, it is stored in a location of a limit store 50 via a gate 49 that is enabled by the sequencer signal $E_9$. The operations performed in this storing operation are similar to those previously described in discussing the store 29.

Following the determination of the set of difference limits $\{SDL_i\}$, the output of the sequencer circuit 18 (FIG. 4) changes to $E_{10}$, resulting in the variation detector 46 being enabled again. Simultaneously, the gates 41 and 41' are also enabled by the signal $E_{10}$, resulting in the previously mentioned set of averages $\{ASA_i\}$ of photosensor output signal amplitudes, stored in the store 29, and the codes $D'_3$ through $D'_{n-2}$, representing the amplitudes of output signals generated by the photosensors during scanning of the defect-free web, being applied to the difference variation detector 46. At this point, the difference variation detector 46 again performs operations similar to those described above, with the average scan amplitudes $ASA_i$, and the codes $D'_i$ generated by output signals for each photosensor as inputs. Generally, the variation detector responds to sequencer circuit output signals $E_{10}$ and $E_{10}'$ in the same manner described in discussing the detector's response to the signals $E_8$ and $E_8'$. In essence, the difference variation detector solves equation (1) again to obtain another set of values $\{S'_i\}$ representing the normal variation in the output amplitude of each photosensor over $r$ scans of the defect-free web. This information is used to determine a set of pairs of values $\{U_i, B_i\}$ representing the allowable range of variation in photosensor output signal amplitudes for each photosensor. The code $D'_i$ generated in response to each photosensor $D_i$ output during the inspection of a web is compared with the pair $\{U_i, B_i\}$ of amplitude limits for the photosensor to determine if the amplitude of the photosensor output is outside of the amplitude range represented by the values of $U_i$ and $B_i$. This is the previously mentioned comparison used to detect gradual changes in web characteristics, such as thickness, which would not be detected by only a comparison of the scan-to-scan amplitude difference in photosensor output signals with a fixed limit. After the set of amplitude variation data $\{S'_i\}$ is determined by the difference variation detector 46, the output of the sequencer circuit changes from $E_{10}'$ to $E_{11}$. The OR gate 46' responds to the signal $E_{11}$ by enabling the limit detector 48. The limit detector 48 sequentially multiplies the set of values $\{S'_i\}$ by a constant $g'$, similar to the previously mentioned constant $g$, to obtain a value $SAL_i = g'S'_i$ representing the allowable range of output signal amplitude variation for each photosensor.

As each of the values $SAL_i$ is determined by the limit detector 48, it is applied to an amplitude range detector 51 via a gate 49' that is enabled by the signal $E_{11}$ present as an output from the sequencer circuit 18. The amplitude range detector 51 converts the values into previously mentioned pairs of values representing upper $U_i$ and lower $B_i$ amplitude magnitudes that identify the range in which the amplitude of a photosensor output signal will fall if there have been no substantial changes in a web being inspected. The amplitude range detector 51 divides each of the values $SAL_i$ by two and adds the quotient to the average amplitude $ASA_i$ of its associated photosensor to obtain the upper limit $U_i$ for the amplitude range. Simultaneously, the lower limit $B_i$ for the amplitude range is obtained by subtracting the quotient from the average amplitude $ASA_i$ for the photosensor. Each of the average photosensor amplitude codes $ASA_i$ contained in the store 29 are applied to the amplitude range detector 51 as the addresses generated by the address generator 17 are applied to the store 29. As the pairs of values $U_i$ and $B_i$ are determined by the amplitude range detector 51, they are stored in the amplitude range store 52 in locations identified by the address generator 17 output, at the time the address generator generates the timing signal T prior to changing the address at its output.

To summarize, the foregoing has described the operations performed by the test unit 6 (FIG. 1) during the automatic calibration of the web inspection apparatus as a defect-free section of web passes the inspection station 7. A set of values $\{SDL_i\}$ representing the maximum allowable scan-to-scan difference in output signal amplitude for each of the photosensors has been determined and stored in the limit store 50 (FIG. 4). As mentioned above, if the variation in the scan-to-scan difference in output signal amplitude for a photosensor $D_i$ exceeds its associated limit $SDL_i$ during the actual inspection of a web, the test unit 6 will generate a signal F indicating the presence of a discrete defect in the web. Additionally, a pair of values $[U_i, B_i]$ indicating the normal range of variation in the amplitude of each photosensor's output signals is stored in the amplitude range store 52 (FIG. 4). If the code $D'_i$, representing the amplitude of an output signal from a photosensor $D_i$, does not satisfy the condition $B_i < D'_i < U_i$, the test unit 6 (FIG. 1) generates a signal F' indicating the presence of a defect in the web resulting from a gradual change in the thickness of the web or its coating, or the presence of foreign matter on or in the web.

Upon completion of the above-described calibration of the inspection apparatus, a web to be inspected is transported past the inspection station 7 (FIG. 1) after a TEST signal is applied to the sequencer circuit 18 (FIG. 4). The application of the TEST signal to the sequencer circuit 18 results in this circuit generating the signal $E_{12}$. The signal $E_{12}$ enables the OR gate 22', and the output of this gate enables the gate 22, during one scan of the web. The addresses and the timing signal T generated by the address generator 17 during this scan of the web result in the codes $D'_3$ through $D'_{n-2}$, generated in response to the occurrence of output signals from the photosensor $D_3$ through $D_{n-2}$, and applied to the scan store 24 via the enabled gate 22, being stored. After this scan of the web, the sequencer circuit 18 output changes from $E_{12}$ to $E_{13}$, and inspection of the web begins.

The signal $E_{13}$ enables comparators 35' and 35, and the OR gate 22' whose output enables the gate 22. Hence, during the current scan of the web, the codes $D'_3$ through $D'_{n-2}$, sequentially generated in response to the occurrence of photosensor output signals, are applied to the comparator 35' in synchronism with the application of the pairs of values $U_i, B_i[$, each of which represents the allowable range of signal amplitude variation for a photosensor, contained in the amplitude range store 52. The comparator 35' determines if the code $D'_i$ generated in response to the output of a photosensor $D_i$ is such that $B_i < D'_i < U_i$. If $D'_i$ satisfies the inequality, indicating that the web thickness is within the required limits, the comparator 35' will generate no output signal. Conversely, if $D'_i$ does not satisfy the inequality, which is the case where the web or its coating is either too thick or too thin, the comparator 35' will generate a signal F' indicating the presence of a defect in the web. This signal F' enables the gate 36, resulting in the contents of the web footage counter 5 being stored in a location in a footage count store 37 with the same address as the address present in the output of the address generator 17. Storing the contents of the footage counter 5 in this location in the footage count store 37 identifies the photosensor output signal that resulted in the generation of the defect signal F', as well as indicating at what point on the web the defect was detected. In essence, this information represents coordinates identifying the position on the web at which the defect was detected. Additionally, the defect signal F' generated by the comparator 35' is also applied to an alarm which may respond to the signal by generating visual or audible signals, or both, to alert coating machine operators.

At the same time that the foregoing operations are being performed, the scan-to-scan amplitude difference in output signals generated by the photosensor $D_i$ on successive scans is compared with the stored difference limit $SDL_i$ associated with the photosensor to determine if a discrete defect is present in the web at the point being inspected. The code $D'_i$, generated in response to the output of the photosensor $D_i$ on this scan of the web, is applied to the subtraction circuit 21. The code contained in the store 24 that was generated in response to the output of this photosensor $D_i$ on the last scan of the web is accessed from the store 24 via the gate 23, which is enabled by the signal $E_{13}$, and applied as a second input to the subtraction circuit 21. The resulting difference $DD'_i$ is applied to the comparator 35 via the gate 27, which is also enabled by the signal $E_{13}$. The difference $DD'_i$ is compared with the difference limit $SDL_i$ associated with the photosensor $D_i$, which is contained in a location of the limit store 50. The code contained in the store 24 and the difference limit $SDL_i$ contained in the store 50 are accessed in synchronism with the generation of the current code $D'_i$, since, as previously described, these signals are accessed with the same addresses that are generated by the address generator 17 to control the web scanning. If the signal $DD'_i$ is less than or equal to the stored limit $SDL_i$, no defect is present at the point in the web being inspected. In essence, this condition indicates that the variation in the scan-to-scan difference in the amplitude of signals generated by the photosensor $D_i$ on successive scans is due to web flutter or, perhaps, acceptable variations in the web. Conversely, if the signal $DD'_i$ is greater than the limit $SDL_i$, a defect is present in the web, and the comparator generates a signal F, indicating the presence of a discrete defect in the web, that enables the gate 36. As previously described, enabling the gate 36 results in the contents of the footage counter 5 being stored in a location of the footage count in the store 37 associated with the photosensor $D_i$, and the activation of the alarm 45.

At this point, the timing signal T is generated by the address generator 17 (FIG. 4), prior to the address at the output of the generator being changed. The generation of the signal T results in the code $D'_i$ generated by the output of the photosensor $D_i$ during the current scan of the web, and contained in the register 16, replacing the code generated by the output of the photosensor $D_i$ on the preceeding scan of the web that is contained in the store 24 if no defect is detected. The code $D'_i$ is applied to the store 24 via the gate 22 which is enabled by a "1" output of the OR gate 22', resulting from the existence of the signal $E_{13}$, and the "1" output generated by the inverter 37' indicating the absence of the defect signals F and F'. The application of the signal T to the store 24 results in the applied code $D'_i$ being stored. In essence, at this point the code $D'_i$ is stored for use in determining the difference between the signal amplitude generated by the photosensor $D_i$ on this scan, and the signal amplitude that will be generated by the photosensor on the next scan. If the presence of a defect is indicated by the code $D'_i$, some combination of the defect signals F and F' is generated and the OR gate 36' is enabled, resulting in a "0" output from the inverter 37'. In this case, the gate 22 is not enabled and the code $D'_i$ does not replace the code generated by a previous output of the photosensor $D_i$ that is stored in the store 24. It will be recalled that a code $D'_i$ generated when a defect is illuminated is of such a value that its use in future subtractions may yield inaccurate results. Hence, the code representing the output of the photosensor $D'_i$ generated during the scan of the defect-free portion of the web preceeding the current scan of the web is left in the store 24 for use when a code is generated by the photosensor $D_i$ on the next scan.

The test data store also responds to the application of the signal T mentioned above by storing the difference $DD'_i$ present at the output of the subtraction circuit 21 to provide a record of the determined scan-to-scan difference in signal amplitude. It will be noted that a display 44 is connected to the various stores in the test unit. This display can be any one of numerous different types of displays, such as a cathode ray tube display, a high speed printer, or a typewriter terminal. The display 44 is used to examine the contents of selected locations in any of the stores. Such data is useful in determining if the test unit is operating properly or, if defects have been detected, the types of defects and their location on the web being inspected.

In summary, the foregoing has described illustrative web inspection apparatus implementing the invention that operates as follows: Scanning is accomplished by sequentially pulsing a set of light sources positioned in an inspection station. During a calibration mode of operation, a defect-free section of web, of the type to be inspected later, is repetitively scanned as it moves past the inspection station, and the apparatus automatically converts the output of a set of photosensors, responsive to the light emitted by the pulsed light sources, into data used to limit the scan width to the width of the web. Additionally, the apparatus converts the photosensor output signals into data representing the normal range of variation in the amplitude and scan-to-scan difference in amplitude of photosensor out-put signals for each photosensor. After automatic calibration of the apparatus is completed, the web to be inspected for defects is transported past the inspection station as the repetitive scanning continues, and the resulting output signals of each photosensor are converted into data that are compared with the previously determined data representing the normal ranges of variation in amplitude and scan-to-scan difference in amplitude for the photosensor's output signals to detect the presence of defects in the web.

It is clear that numerous variations, modifications, and adaptations of the illustrative embodiment which fall within the spirit and scope of the invention will become apparent to one skilled in the art after reading this disclosure. For instance, it is obvious that the numerous individual stores in the illustrative embodiment can be replaced with a single large memory where desirable. Similarly, it is apparent that the described control and data processing functions performed by the apparatus can also be performed by a stored program data processor, and the program required to control the data processor in the performance of these functions is obvious in view of the disclosure.

What is claimed is:

1. In apparatus for inspecting a moving web, the combination comprising:
    a scanner for repetitively scanning said moving web including means for illuminating a plurality of web sections across the width of said web on each scan, and
    detection means for generating intensity signals with amplitudes representing the light transmitted through, or reflected from, each illuminated section of said web;
    means for converting the intensity signals generated by said detection means, in response to the repeated illumination of each web section during a plurality of web scans, as a first length of said web passes said scanner, into sets of data representing the normal ranges of variation in selected characteristics of the intensity signals associated with each section of said moving web;
    means for storing said sets of data; and
    means for comparing said selected characteristics of each intensity signal generated by said detection means during a scan, as a second length of said web passes said scanner, with the set of stored data representing the normal ranges of variation in said selected characteristics for the intensity signal.

2. The apparatus of claim 1 wherein said means for converting generates a set of data representing the normal range of variation in signal amplitude for each set of intensity signals generated in response to the repetitive illumination of a section of said web as said first length of said web passes said scanner.

3. The apparatus of claim 1 wherein said means for converting generates a set of data representing the normal range of variation in the scan-to-scan difference in signal amplitude for each set of intensity signals generated in response to the repetitive illumination of a section of said web as said first length of said web passes said scanner.

4. In apparatus for inspecting a moving web, the combination comprising:
    means for periodically illuminating selected sections of said web in sequence;
    means for generating signals with amplitudes representing the intensity of the light transmitted through, or reflected from, each of the illuminated sections of said web;
    amplitude comparator means for determining if the amplitudes of signals generated in response to the periodic illumination of a section of said web are within the normal range of stored signal amplitudes generated by said means for generating as a result of periodically illuminating the same section of a defect-free web; and
    signalling means responsive to said amplitude comparator for generating a defect signal when the amplitudes of one of said signals is outside of said normal range of signal amplitudes.

5. The apparatus of claim 4, further comprising:
    a difference comparator for determining if the difference in amplitude of signals generated in response to two successive illuminations of a section of said web is within the normal range of such differences obtained when the same section of a defect-free web is periodically illuminated;
    wherein said signalling means is further responsive to said difference comparator for generating a defect signal when said difference in signal amplitude is outside of said normal range of such differences.

6. The apparatus of claim 4 wherein said means for periodically illuminating selected sections of said web further comprises:
    a plurality of light emitting diodes arranged in a pattern extending across the width of said web; and
    means for repetitively pulsing said light emitting diodes in sequence to illuminate said selected sections of said web.

7. In apparatus for inspecting a moving web, the combination comprising:
    means for repetitively illuminating selected discrete sections of said web in sequence for selected intervals;
    detection means for generating signals with amplitudes representing the intensity of the light transmitted through, or reflected from, each illuminated section of said web;

storage means containing predetermined amplitude data representing normal ranges of signal amplitudes resulting from the repetitive illumination of each of said selected sections on a defect-free web of the same type as said web;

an amplitude comparator for comparing the amplitudes of the signals generated in response to repetitive illumination of a section of said web with the stored amplitude data representing the normal range of signal amplitudes for this section of said web; and signalling means responsive to said amplitude comparator for generating a first defect signal when said signal amplitude is outside of said normal range of amplitudes.

8. The apparatus of claim 7, further comprising:

storage means containing predetermined amplitude difference data representing the normal ranges of variation in the scan-to-scan difference in amplitudes of signals resulting from the repetitive illumination of each of said sections on a defect-free web of the same type as said web;

means for determining the scan-to-scan difference in amplitude of signals generated by said detection means in response to repetitive illumination of each section of said web;

an amplitude difference comparator for comparing the determined scan-to-scan amplitude difference for a section of said web with the stored amplitude difference data representing the normal range of such amplitude differences for this section of said web;

wherein said signalling means is further responsive to said amplitude difference comparator for generating a second defect signal when said determined scan-to-scan amplitude difference is outside of said normal range of such differences.

9. In apparatus for inspecting a moving web, the combination comprising:

illumination means for repetitively scanning the width of said web over a path with a length greater than the width of said web;

detection means for generating signals with amplitudes representing the intensity of the light transmitted through, or reflected from, selected areas illuminated during said scanning;

means for determining the average amplitude of each set of signals generated in response to the repetitive illumination of each of said areas during a selected number of scans;

means responsive to the determined average amplitudes for limiting the scan width to the width of said web; and defect detection means responsive to signals generated by said detection means during the limited width scans for indicating the presence of defects in said web.

10. The apparatus of claim 9 wherein said defect detection means further comprises:

amplitude comparator means for determining if the amplitudes of said signals generated in response to the repetitive illumination of a selected one of said areas during said limited width scanning are outside a predetermined range of amplitudes; and means responsive to said amplitude comparator for generating a defect signal when the amplitude of one of said signals is outside said predetermined range of amplitudes.

11. The apparatus of claim 9 wherein said defect detection means further comprises:

means for determining if, during the limited width scanning, the scan-to-scan difference in the amplitudes of signals generated on two successive illuminations of a section of said web is outside a predetermined range of such differences; and means responsive to said means for determining for generating a defect signal when the determined difference is outside said predetermined range of such differences.

12. In apparatus for inspecting a moving web by repetitively scanning said web, the combination comprising:

a plurality of light emitting diodes aligned transverse to the direction of travel of said web and positioned to illuminate selected sections of said web when activated;

means for periodically activating selected ones of said light emitting diodes to intermittently illuminate discrete sections of said web;

means responsive to the light transmitted through, or reflected from, each illuminated section of said web for generating a signal with an amplitude representing the intensity of the light emanating from said illuminated section;

comparison means for determining if said amplitude of said signal falls with a predetermined range of amplitudes that is related to the variation in signal amplitudes generated when said section of a defect-free web is repetitively illuminated; and means responsive to said comparison means for generating a defect signal when the amplitude of said signal is outside of said predetermined range of amplitudes.

13. The apparatus of Claim 12 wherein said means responsive to light transmitted through, or reflected from, each illuminated section of said web further comprises:

a plurality of photosensors aligned transverse to the direction of travel of said web, each being positioned to intercept light emanating from one of said sections of said web when said section is illuminated; and means for converting the analog signals generated by said photosensors into digital codes.

14. The apparatus of claim 12, further comprising:

means for determining the difference between the amplitudes of signals generated by illuminating a selected section of said web on two successive scans;

a second comparison means for determining if the difference in signal amplitudes falls within a predetermined range of amplitude differences that is related to the variation of such amplitude differences which occur when said section of a defect-free web is repetitively illuminated; and means responsive to said second comparison means for generating a defect signal when said amplitude difference falls outside of said predetermined range of amplitude differences.

15. In apparatus for inspecting a moving web, the combination comprising:

a plurality of light emitting diodes aligned transverse to the direction of travel of said web and positioned to illuminate selected sections of said web when activated;

a plurality of photosensors aligned transverse to the direction of travel of said web, each being positioned to intercept light emanating from one of said sections of said web when said section is illuminated;

means for sequentially activating said light emitting diodes to produce repetitive scans of said web;

means for converting the photosensor output signal resulting from the illumination of a selected section of said web during a first scan into a first digital amplitude code;

means for storing said first digital amplitude code;

storage means containing sets of digital amplitude data, each of said sets of amplitude data representing a range of amplitudes associated with one of said web sections;

a first comparator for comparing said first digital amplitude code generated as a result of illuminating said selected web section with the set of amplitude data representing the range of amplitudes associated with said selected web section; and means responsive to said comparator for generating a defect signal when said first digital amplitude code is not within the amplitude range represented by said set of amplitude data associated with said selected web section.

16. The apparatus of claim 15 wherein a second digital amplitude code is generated in response to the illumination of said selected web section on a second scan of said web, further comprising:

means for generating a digital amplitude difference code representing the difference between the amplitudes represented by said second digital amplitude code and the stored first digital amplitude code;

storage means containing sets of digital amplitude difference data, each of said sets of amplitude difference data representing a range of amplitude differences associated with one of said sections of said web;

a second comparator for comparing said digital amplitude difference code with the set of data representing a range of amplitude differences associated with said selected web section; and means responsive to said second comparator for generating a defect signal when said digital amplitude difference code is not within the range of amplitude differences represented by said set of digital amplitude difference data associated with said selected web section.

* * * * *